(12) United States Patent  
Oishi et al.

(10) Patent No.: US 8,166,657 B2  
(45) Date of Patent: May 1, 2012

(54) NEEDLE ROLLER BEARING

(75) Inventors: Shinji Oishi, Iwata (JP); Yasuyuki Watanabe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/851,952

(22) Filed: Aug. 6, 2010

(65) Prior Publication Data

US 2010/0313423 A1 Dec. 16, 2010

Related U.S. Application Data

(62) Division of application No. 11/659,950, filed as application No. PCT/JP2005/014293 on Aug. 4, 2005, now abandoned.

(30) Foreign Application Priority Data

Aug. 16, 2004 (JP) ................................. 2004-236404

(51) Int. Cl.  
*F16C 33/64* (2006.01)

(52) U.S. Cl. ......... 29/898.065; 29/898.063; 29/898.061; 29/898.067; 384/569; 384/572

(58) Field of Classification Search ............... 29/898.42, 29/898.06, 898.061, 898.062, 898.064, 898.066, 29/898.067, 898.13, 898.14; 384/569, 572, 384/573  
See application file for complete search history.

(56) References Cited

U.S. PATENT DOCUMENTS

| | | | | |
|---|---|---|---|---|
| 1,444,326 A | * | 2/1923 | Buckwalter | 29/898.067 |
| 1,985,693 A | * | 12/1934 | Robinson | 384/584 |
| 2,038,474 A | * | 4/1936 | Brown | 384/559 |
| 2,894,791 A | * | 7/1959 | White et al. | 384/564 |
| 3,046,064 A | * | 7/1962 | Schaeffler | 384/572 |
| 3,080,639 A | * | 3/1963 | Guido et al. | 29/898.067 |
| 3,256,585 A | * | 6/1966 | Ripple | 29/898.067 |
| 3,353,246 A | * | 11/1967 | Farmer | 29/898.067 |
| 3,494,684 A | * | 2/1970 | Benson | 384/580 |
| 3,499,200 A | * | 3/1970 | Wilson | 29/898.067 |
| 3,558,200 A | * | 1/1971 | Barr | 384/464 |
| 3,626,565 A | * | 12/1971 | Koch | 29/898.067 |

(Continued)

FOREIGN PATENT DOCUMENTS

JP 3-170617 7/1991

(Continued)

OTHER PUBLICATIONS

ASM International Handbook Committee (1991). ASM Handbook, vol. 04—Heat Treating.. ASM International. Online version available at: http://www.knovel.com/web/portal/browse/display?_EXT_KNOVEL_DISPLAY_bookid=3108&VerticalID=0.*

(Continued)

*Primary Examiner* — David Bryant  
*Assistant Examiner* — Jason L Vaughan  
(74) *Attorney, Agent, or Firm* — Wenderoth, Lind & Ponack, L.L.P.

(57) ABSTRACT

A steel retainer (3), which retains needle rollers (2), is formed from a steel plate containing 0.15 to 1.10% by mass of carbon. After being formed, the steel plate is subjected to induction heat treatment which includes induction hardening and induction tempering. Such heat treatment can be carried out efficiently in a short period of time, using compact treatment facilities, even in small-lot production. The retainer (3) thus formed is sufficiently resistant to wear and surface damage, and is high in fatigue strength and fracture strength as a whole.

1 Claim, 4 Drawing Sheets

U.S. PATENT DOCUMENTS

| | | | | |
|---|---|---|---|---|
| 3,722,969 | A | 3/1973 | Eklund | |
| 4,393,563 | A * | 7/1983 | Smith | 419/28 |
| 4,441,239 | A * | 4/1984 | Mullen | 29/898.061 |
| 4,442,331 | A | 4/1984 | Watanabe | |
| 4,523,362 | A * | 6/1985 | Cuozzo et al. | 29/898.063 |
| 4,821,385 | A * | 4/1989 | Ueno et al. | 29/898.061 |
| 5,256,495 | A * | 10/1993 | Holtz et al. | 428/579 |
| 5,630,668 | A | 5/1997 | Ikezawa et al. | |
| 5,848,846 | A * | 12/1998 | Sugiyama et al. | 384/625 |
| 6,101,719 | A * | 8/2000 | Kiuchi et al. | 29/898.13 |
| 6,109,791 | A * | 8/2000 | Metton et al. | 384/99 |
| 6,176,623 | B1 * | 1/2001 | Zeigler | 384/559 |
| 6,179,474 | B1 * | 1/2001 | Podhajecki | 384/573 |
| 6,682,227 | B2 * | 1/2004 | Grell et al. | 384/569 |
| 7,229,215 | B2 * | 6/2007 | Kotani | 384/580 |
| 2005/0039829 | A1 | 2/2005 | Christofis et al. | |
| 2005/0257860 | A1 * | 11/2005 | Takayama | 148/572 |

FOREIGN PATENT DOCUMENTS

| | | | |
|---|---|---|---|
| JP | 06017825 A * | 1/1994 | |
| JP | 06159375 A * | 6/1994 | |
| JP | 10-046318 | 2/1998 | |
| JP | 11-303875 | 11/1999 | |
| JP | 2000-205274 | 7/2000 | |
| JP | 2001-187921 | 7/2001 | |
| JP | 2004-028208 | 1/2004 | |
| JP | 2004156724 A * | 6/2004 | |

OTHER PUBLICATIONS

Extended European Search Report issued Dec. 21, 2010 in European Patent Application No. 05 76 8435, which is a foreign counterpart of the present application.

* cited by examiner

NEEDLE ROLLER BEARING

This is a divisional application of U.S. patent application Ser. No. 11/659,950, filed Feb. 12, 2007 now abandoned, which is the National Stage of International Application No. PCT/JP2005/014293, filed Aug. 4, 2005.

TECHNICAL FIELD

The present invention relates to a needle roller bearing including needle rollers as rolling elements.

BACKGROUND ART

A steel retainer is used to retain needle rollers of many of radial type needle roller bearings, in which the needle rollers are arranged along a cylindrical surface having a central axis, and thrust type needle roller bearings, in which the needle rollers are arranged around a central axis so as to extend in radial directions. Some of such needle roller bearings, of which the needle rollers have a small diameter, include only the retainer besides the rolling elements, and others further include at least one bearing ring selected from inner and outer bearing rings. Because needle roller bearings of either of the above types are thin compared to rolling bearings including other rolling elements, but are still sufficiently large in load capacity, by using such bearings, it is possible to reduce the size of devices and machines such as industrial machines and motor vehicles in which such needle roller bearings are used. Thus, needle roller bearings are now increasingly taking the place of e.g. slide bearings.

According to how they are manufactured, steel retainers used in radial type needle roller bearings are roughly classified into ones formed by cutting pipe members, ones formed by blanking a plate member to obtain a disk-shaped blank, and pressing, i.e. drawing the disk-shaped blank, and ones formed by cutting a strip of plate to a required length, annularly bending the thus cut strip and welding its ends together. In order to improve productivity, in many cases, pockets are punched, a step is formed by pressing, and bent portions are formed while the retainer is in the state of the strip. On the other hand, steel retainers of thrust type needle roller bearings are formed by blanking or cutting a plate member and optionally pressing.

These steel retainers come in various shapes according to their intended use. But they all have a plurality of pockets for receiving needle rollers which are formed by punching and define bridges therebetween. The needle rollers, which are received in the respective pockets and roll therein, are brought into sliding contact with the side walls of the bridges. Some needle rollers may skew while rolling. If they skew, the needle rollers locally come into sliding contact with the side walls of the bridges, which results in extremely increased slide contact pressure therebetween. If such a needle roller bearing includes a bearing ring, the radially inner or outer surface of the retainer may be brought into sliding contact with the bearing ring. Thus, the sliding contact surface of such a retainer may suffer surface damage such as seizure besides wear.

Conventional steel retainers of conventional needle roller bearings are typically formed from low-carbon steel for machine structural use such as S15C, low-carbon alloy steel such as SCM415, and low-carbon cold drawn steel plate such as SPC which all contain not more than 0.15% by mass of carbon, for ease of cutting and pressing during manufacturing steps. In order to prevent wear of and surface damage to retainers made of such steels, i.e. steels containing not more than 0.15% by mass of carbon, after machining, such conventional retainers are subjected to surface heat treatment such as carburizing, carbonitriding or nitrocarburizing (as disclosed in Patent document 1). Otherwise, portions of their pockets that are brought into contact with the rolling elements are subjected to surface hardening such as induction hardening or shock hardening after carbonitriding as preheat treatment or without such preheat treatment (as disclosed in Patent document 2). In Patent document 2, after the surface hardening, the surface hardness increases to not less than 250 HV with the core hardness maintained at not more than 190 HV. It is also known to modify the surfaces of steel retainers to increase their wear resistance and surface fatigue resistance by subjecting the retainers to surface chemical treatment such as plating with a metal such as silver or copper, oxide film treatment such as manganese phosphate treatment (as disclosed in Patent document 3).

Patent document 1: JP patent publication 10-46318A (pages 3 and 4)
Patent document 2: JP patent publication 2000-205274A (pages 2 and 3)
Patent document 3: JP patent publication 11-303875A (pages 2 and 3)

SUMMARY OF THE INVENTION

Object of the Invention

Means for modifying the surfaces of steel retainers by surface heat treatment such as carburizing, carbonitriding and nitrocarburizing, as used for the abovementioned conventional needle roller bearings requires adjustment of the atmosphere, so that large heat treatment facilities including a large atmospheric furnace are needed. A long time is also necessary to diffuse carbon and nitrogen. For high efficiency, when the atmosphere is adjusted for heat treatment, a large number of parts have to be treated at one time. This increases the number of parts in one lot, which in turn increases the number of unfinished parts, thereby increasing the lead time. Moreover, it is necessary to dispose of waste oil such as hardening oil, which increases the load on the global environment to an unignorable level.

Means for modifying the surfaces of steel retainers by chemical surface treatment such as metal plating and oxide film treatment needs large surface treatment facilities for e.g. plating. Also, it is necessary to form surface films such as plating films and oxide films. A long time is needed to grow such films to a sufficient thickness. As with the abovementioned surface heat treatment, the number of parts in one lot increases, so that the number of unfinished parts increases, thus increasing the lead time. Also, it is necessary to dispose of waste liquid such as plating liquid, which increases the load on the global environment.

If the treatment facilities stop due to blackout or any other trouble during surface heat treatment or surface chemical treatment for surface modification, a large number of retainers being treated will become defective. A long time and a huge cost are required to recall such defective retainers and restart the facilities. To minimize this trouble, if retainers are produced in small lots, production efficiency lowers and the possibility increases that different types of retainers in different lots may mix together.

In Patent document 2, means are disclosed for subjecting the retainer of a rolling bearing (roller bearing in the embodiment) to surface hardening such as induction hardening or shock hardening. In this arrangement, if carburizing as preheat treatment is omitted, no heat treatment facilities such as an atmospheric furnace are necessary. But if such surface hardening is applied to a retainer of a needle roller bearing as a kind of roller bearing disclosed in Patent document 2, because such a retainer has a large number of pockets, it takes an extremely long time to harden only the surface thereof near the respective pockets. Further, because the bridges defining the pockets of such a retainer are subjected to compressive stress and tensile stress due to skewing when the needle rollers alternately move forward and backward relative to the retainer, it is difficult to increase the fatigue strength and fracture strength of the entire retainer by surface hardening alone.

An object of the present invention is to efficiently subject steel retainers of needle roller bearings to heat treatment in a short period of time even in small-lot production using compact treatment facilities, thereby producing retainers having improved resistance to wear and surface damage and high in fatigue strength and fracture strength as a whole.

Means to Achieve the Object

In order to achieve this object, the present invention provides a needle roller bearing comprising a plurality of needle rollers and a steel retainer retaining the needle rollers, wherein the steel retainer is subjected to induction heat treatment comprising at least induction hardening over the entire area and entire thickness thereof.

By subjecting such steel retainers to induction heat treatment comprising at least induction hardening over the entire area and entire thickness thereof, using induction heat treatment facilities which need no adjustment of atmosphere, are compact in size and can be used for small-lot production, it is possible to efficiently handle such steel retainers of needle roller bearings, which are typically small in size and thickness, during heat treatment thereof. The retainers thus obtained have improved resistance to wear and surface damage and high in fatigue strength and fracture strength as a whole. Because induction heat treatment uses electricity, a clean energy source, the load on the global environment is minimum.

Because the induction heat treatment comprises at least induction hardening, the heat treatment steps can be made inline. Ordinarily, induction heat treatment comprises induction hardening and induction tempering or furnace tempering. By selecting induction tempering, because both induction hardening and induction tempering can be carried out in a short period of time, these steps can be easily made inline.

The needle roller bearing according to the present invention may further comprise at least one bearing ring selected from inner and outer rings.

Preferably, the steel retainer has a surface hardness and an inner hardness within a range of 350 to 700 HV in terms of Vickers hardness. The higher the hardness, the higher the wear resistance and the fatigue strength of the entire retainer. If the hardness of the steel retainer is less than 350 HV, the wear resistance and the fatigue strength thereof will be insufficient. If the hardness is too high, the toughness and thus the fracture strength decrease, so that the retainer tend to be broken. If the hardness is too low, the retainer tends to be broken due to deformation. Thus, the hardness of the steel retainer is more preferably within a range of 400 to 650 HV.

The carbon content of the steel retainer is preferably within a range of 0.15 to 1.10% by mass. If the carbon content is less than 0.15% by mass, it is difficult to sufficiently increase the surface hardness of the steel retainer by induction hardening alone. The higher the carbon content, the lower the workability and weldability. Thus, the carbon content is preferably not more than 1.10% by mass, more preferably not more than 0.50% by mass. If the carbon content is not more than 0.30% by mass, carbon can be completely blended into the iron matrix in the form of a solid solution, so that it is possible to omit induction tempering or furnace tempering during the induction heat treatment.

Advantages of the Invention

By subjecting the steel retainer of the needle roller bearing according to the present invention to induction heat treatment comprising at least induction hardening over the entire area and entire thickness thereof, using induction heat treatment facilities which need no adjustment of atmosphere, are compact in size and can be used for small-lot production, it is possible to efficiently handle such steel retainers of needle roller bearings, which are typically small in size and thickness, during heat treatment thereof. The retainers thus obtained have improved resistance to wear and surface damage and high in fatigue strength and fracture strength as a whole. Because induction heat treatment uses electricity, a clean energy source, the load on the global environment is minimum.

Because the induction heat treatment comprises at least induction hardening, the heat treatment steps can be made inline.

DESCRIPTION OF REFERENCE NUMERALS

1: Outer ring
1*a*: Raceway
2: Needle roller
3: Retainer
3*a*: Pocket
4: Outer ring
5: Inner ring
4*a*, 5*a*: Raceway
4*b*, 5*b*: Claw
6: Needle roller
7: Retainer

DETAILED DESCRIPTION OF THE INVENTION

Figure 1:
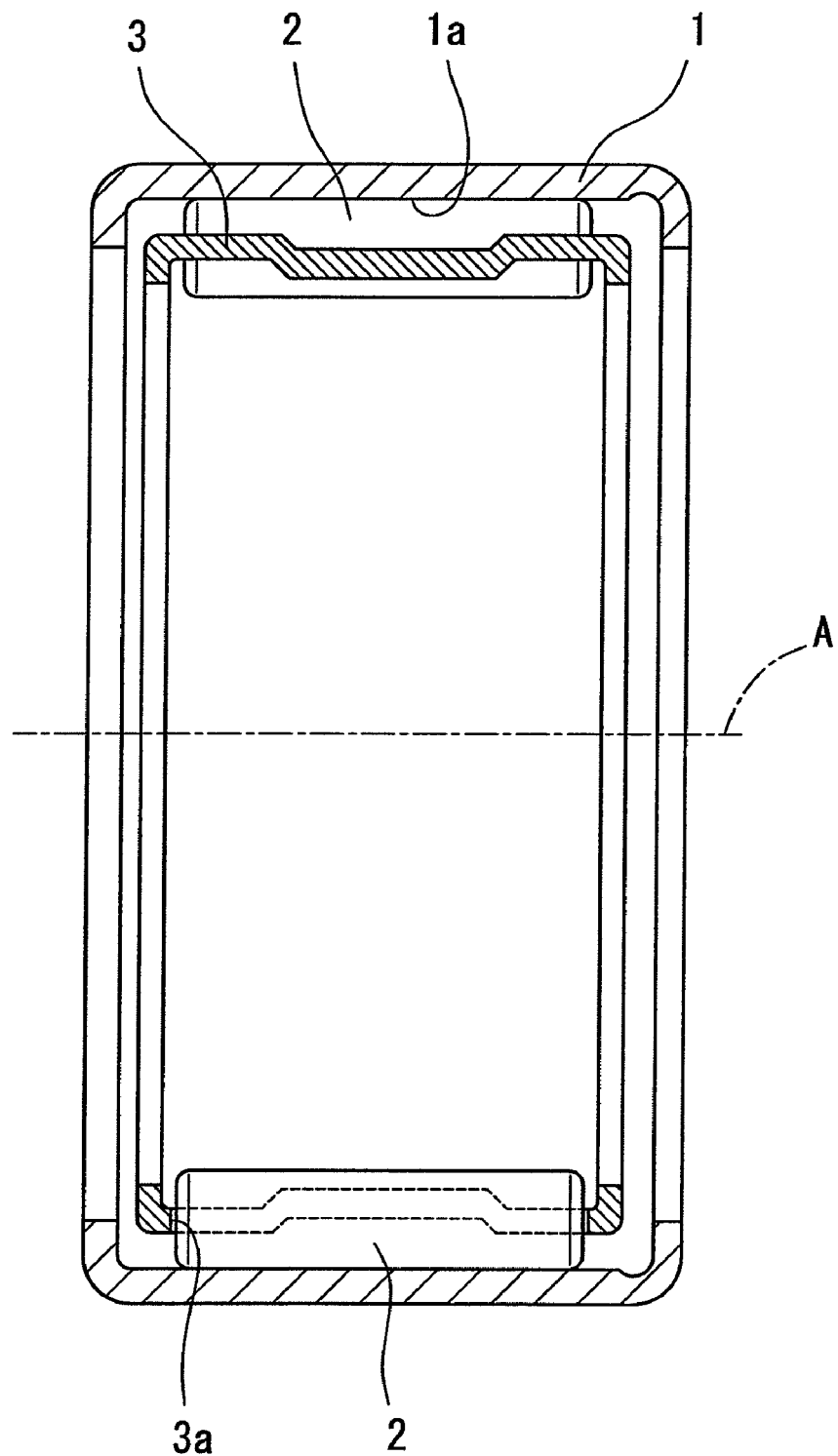
FIG. 1 is a vertical sectional view of a needle roller bearing according to a first embodiment.
Figure 2:
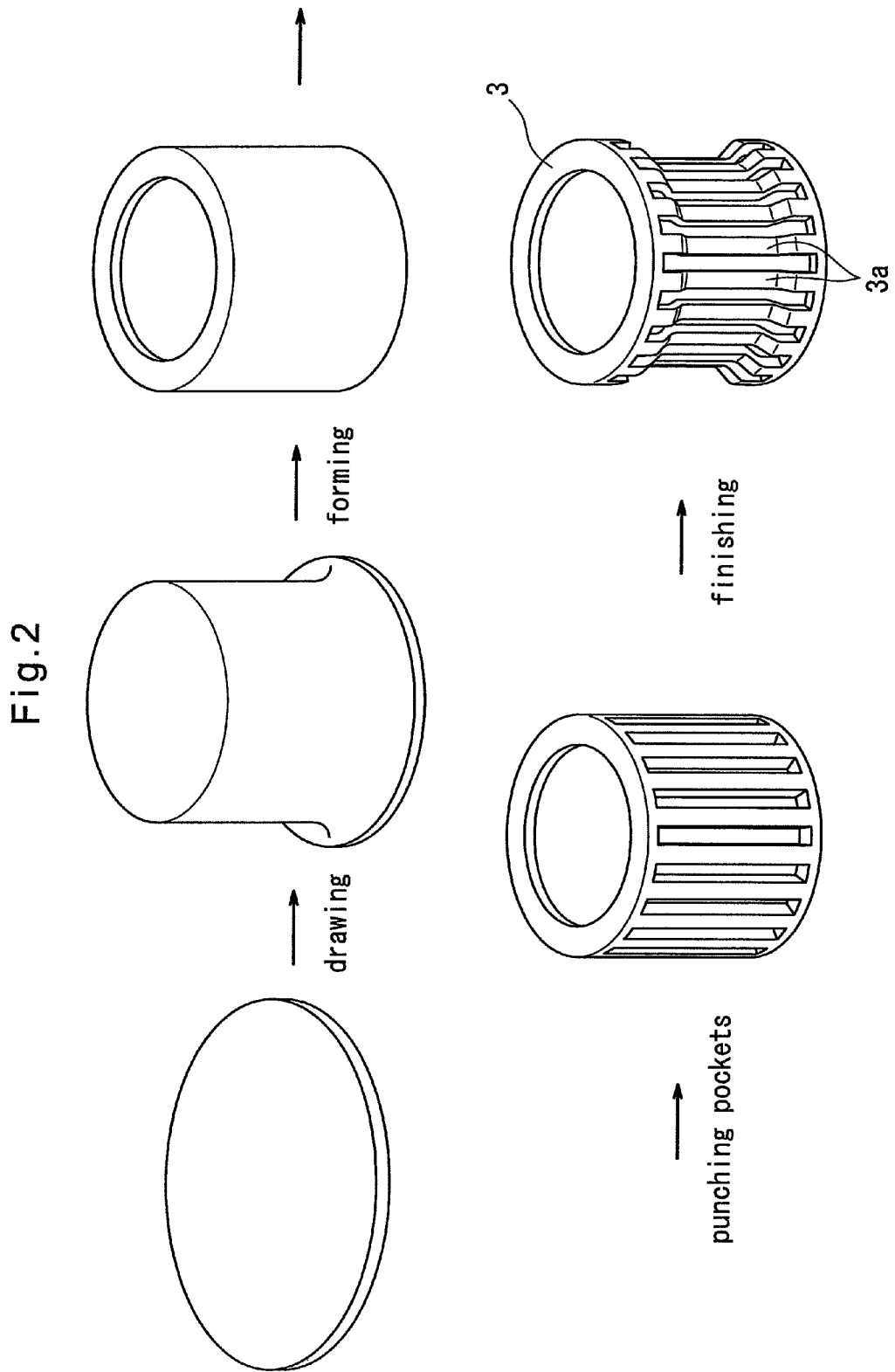
FIG. 2 schematically shows pressing steps of a steel retainer of FIG. 1.

The embodiments are now described with reference to the drawings. FIGS. 1 and 2 show the first embodiment. As shown in FIG. 1, this needle roller bearing is of the radial type in which needle rollers 2 arranged on a cylindrical surface having an axis A along a raceway 1*a* of an outer ring 1 are retained by a retainer 3 made of steel. The outer ring 1 shown is a shell type outer ring formed by pressing a steel plate. But instead, the outer ring according to the invention may be formed by cutting.

The retainer 3 is formed by pressing. As shown in FIG. 2, the retainer 3 is formed by blanking a steel plate to obtain a disk-shaped blank, drawing the disk-shaped blank into a cup member, removing the bottom of the cup member and cutting and bending edges in a forming step to provide a cylindrical member having flanges at both ends, forming pockets 3a for receiving the needle rollers 2 by punching in a punching step, and forming a step at an intermediate portion of the cylindrical member in a finishing step.

The retainer 3 is formed from a steel blank made of structural carbon steel S50C, which contains 0.50% by mass of carbon. After pressing as shown in FIG. 2, the steel blank is subjected to induction heat treatment comprising induction hardening and induction tempering over the entire area and entire thickness thereof so that the surface of the end product has a Vickers hardness within the range of 400 to 650 HV. But the retainer 3 may be formed from a steel blank made of structural carbon steel other than S50C or a tool steel such as SK5, provided such steel contains carbon by 0.15 to 1.10% by mass. If the carbon content of the steel blank is not more than 0.30% by mass, the induction tempering step may be omitted. Induction heat treatment may be carried out after the retainer 3, outer ring 1 and needle rollers 2 have been assembled into a bearing. The induction tempering step may be replaced by furnace tempering.

Figure 3:
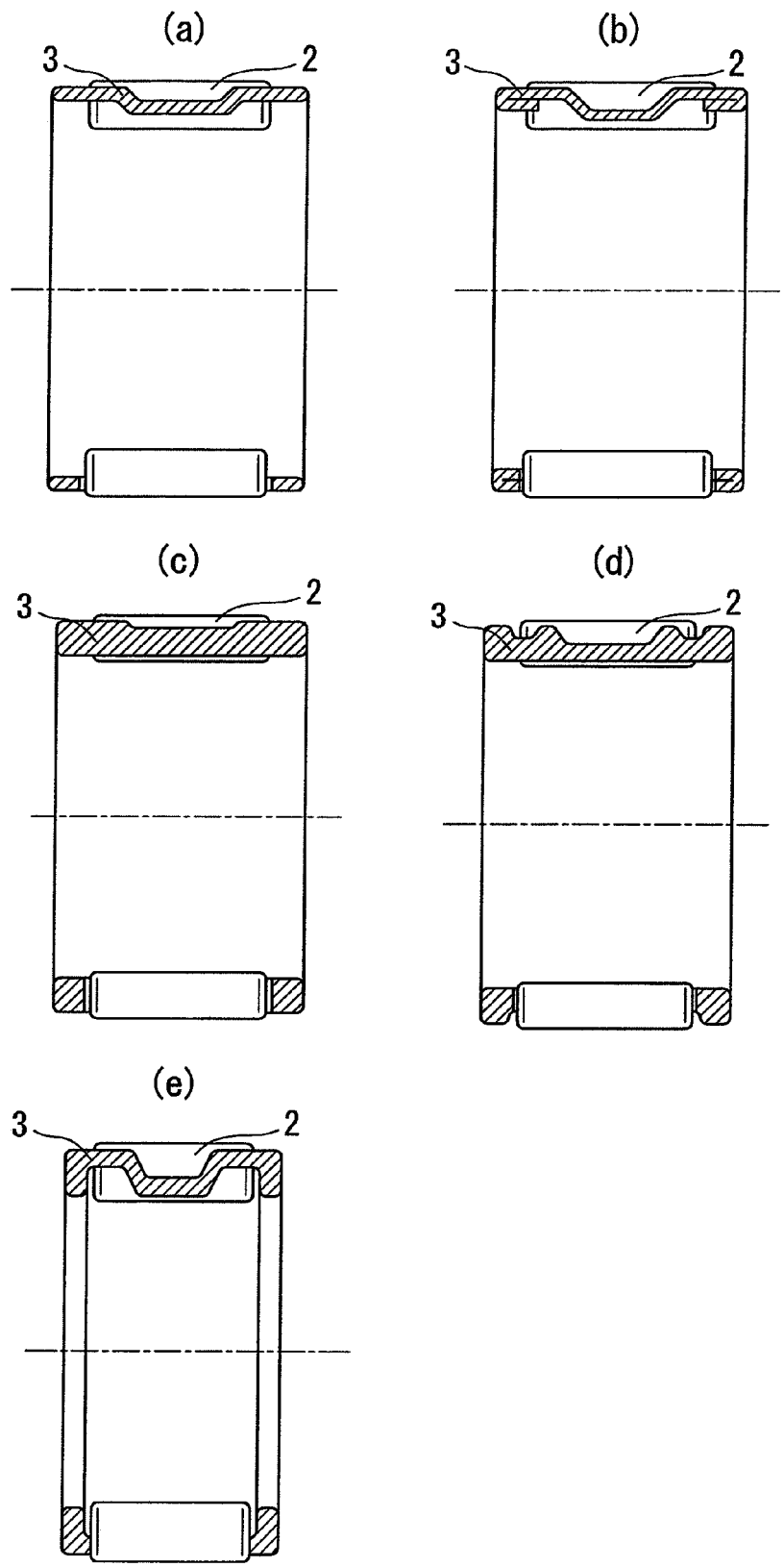
FIGS. 3(*a*)-(*e*) are sectional views of modifications of the steel retainer of FIG. 1.

FIGS. 3(a) to 3(e) show steel retainers 3 which are identical to the retainer of FIG. 1 except their shapes. The retainers of FIGS. 3(a) and 3(b) are formed by pressing, or by cutting a steel strip formed with pockets to a required length, annularly bending the thus cut strip, and welding their ends together. The retainer of FIG. 3(c) is formed by annularly bending a blank strip which has been formed with a step by pressing and pockets by punching beforehand, and welding their ends together. The retainers of FIGS. 3(d) and 3(e) are formed by cutting a pipe member. The needle roller bearing according to the present invention may comprise any of the retainers 3 of these modified embodiments and the first embodiment and the needle rollers with no bearing rings.

Figure 4:
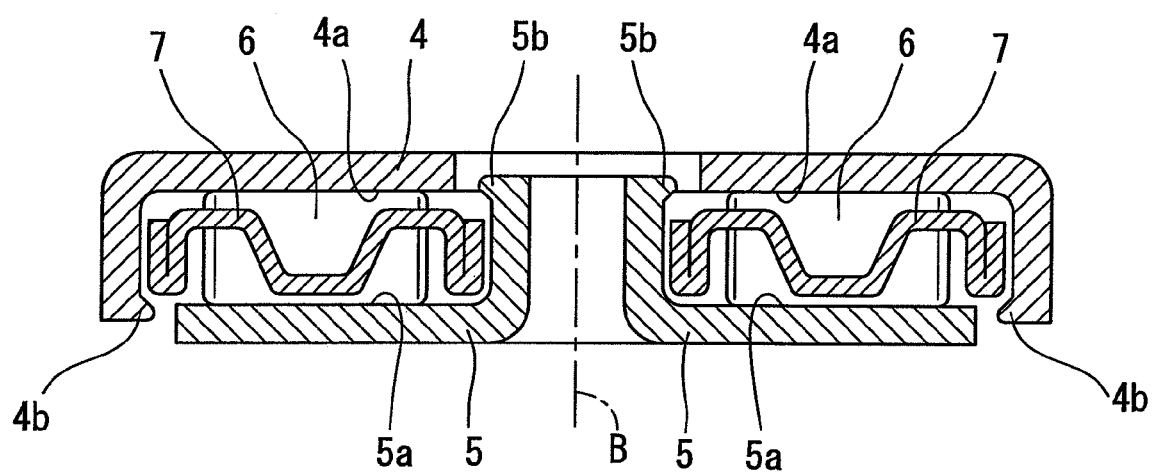
FIG. 4 is a vertical sectional view of a needle roller bearing according to a second embodiment, with a portion thereof omitted.

FIG. 4 shows the second embodiment. This needle roller bearing of this embodiment is of the thrust type and comprises an outer ring 4 and an inner ring 5 having raceways 4a and 5a, respectively, and needle rollers 6 disposed around an axis B so as to extend in radial directions between the raceways 4a and 5a. The needle rollers 6 are retained by a steel retainer 7. Claws 4b and 5b are formed on the outer ring 4 and the inner ring 5, respectively, to prevent separation of the respective needle rollers 6, which are retained by the outer ring 4, inner ring 5 and retainer 7.

The retainer 7 is formed by welding its ends together and is formed from a steel blank made of structural carbon steel S30C, which contains carbon by 0.30% by mass. This retainer 7 is also subjected to induction heat treatment comprising induction hardening and induction tempering after forming and welding so that the surface of the end product has a Vickers hardness within the range of 400 to 650 HV.

What is claimed:

1. A method of manufacturing a needle roller bearing having a plurality of needle rollers, a steel retainer retaining the needle rollers, and a shell type outer ring, said method comprising:

pressing a steel plate into the shell type outer ring;

blanking a plate member into a disk-shaped blank;

pressing the disk-shaped blank to form the steel retainer, wherein said pressing of the disk-shaped blank includes a drawing operation;

assembling the needle rollers, the steel retainer and the outer ring into the needle roller bearing; and thereafter subjecting the steel retainer to induction heat treatment comprising at least induction hardening over the entire area and entire thickness of the steel retainer, wherein said induction heat treatment further comprises induction tempering, wherein a carbon content of the steel retainer is within a range of 0.15 to 1.10% by mass, and wherein the steel retainer has a surface hardness and an inner hardness within a range of 400 to 650 HV in terms of Vickers hardness over the entire steel retainer after said induction heat treatment.

* * * * *